United States Patent [19]
Renz et al.

[11] 3,960,011
[45] June 1, 1976

[54] FIRST FAULT INDICATOR FOR ENGINES

[75] Inventors: Alfred C. Renz, Commack; Roy W. Spacie, Huntington; Edward J. Fuller, Garden City, all of N.Y.

[73] Assignee: Harris Corporation, Cleveland, Ohio

[22] Filed: Nov. 18, 1974

[21] Appl. No.: 524,489

[52] U.S. Cl. .............................. 73/116; 324/78 F; 340/415
[51] Int. Cl.² ...................................... G01M 15/00
[58] Field of Search ........... 73/116, 117.3; 340/414, 340/415; 324/78 R, 78 Q, 78 Z, 83 D

[56] References Cited
UNITED STATES PATENTS

| | | | |
|---|---|---|---|
| 3,184,606 | 5/1965 | Orenden et al. | 324/78 Q |
| 3,202,834 | 8/1965 | Pingry et al. | 324/78 Q UX |
| 3,512,405 | 5/1970 | Schlicher | 73/116 |
| 3,660,669 | 5/1972 | Grenon | 357/19 UX |
| 3,729,734 | 4/1973 | Kipling | 340/415 |

OTHER PUBLICATIONS
Gi, W. Pulse Rate Detector (IBM Disclosure Bulletin) vol. 11, No. 10 Mar. 1969. p. 1251.

*Primary Examiner*—Jerry W. Myracle

[57] ABSTRACT

A plurality of indicating circuits are coupled to monitor the operating parameters or conditions, such as, for example, oil pressure, temperature, fuel level, and speed, of an engine or the like, and such indicating circuits provide an indication of the first occurring fault or failed parameter capable of causing engine shut down. Optical isolators are used to facilitate coupling respective indicating circuits to conventional condition responsive switches, such as oil pressure and engine temperature switches, and in response to an analog input signal proportional to engine speed a speed detector provides a digital output signal indicative of whether the engine speed is above or below a predetermined level. Moreover, after one indicating circuit has indicated a fault, a disabling circuit disables the other indicating circuits from indicating subsequent faults, and an automatic reset circuit effectively over-rides the disabling circuit to reset each of the indicating circuits upon engine start-up.

23 Claims, 14 Drawing Figures

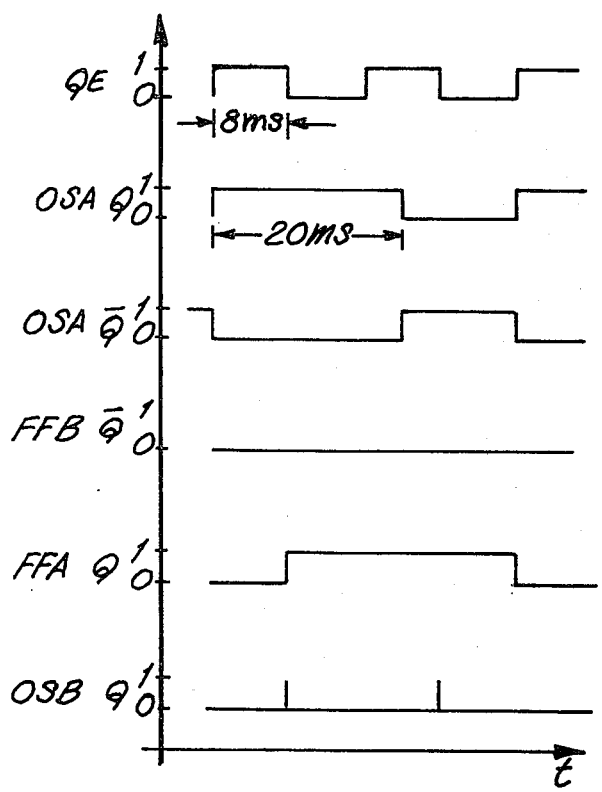
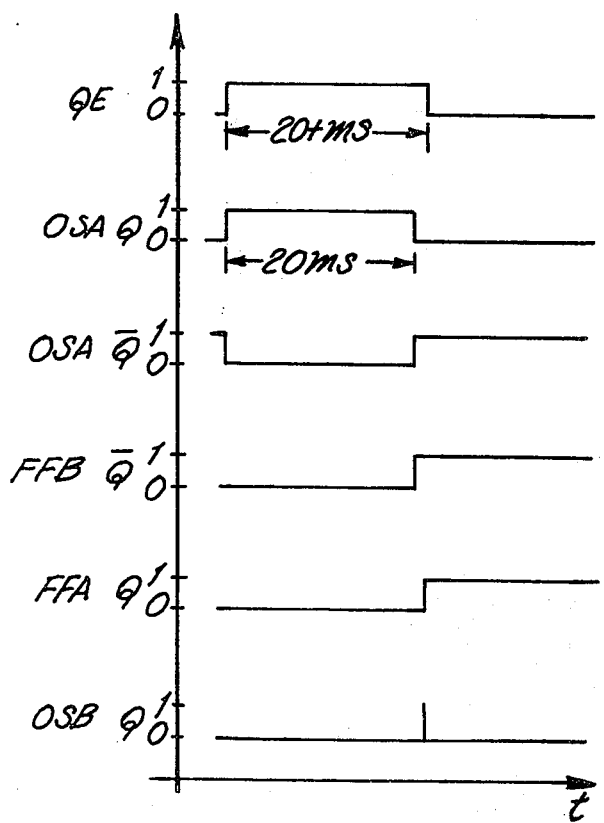

FIRST FAULT INDICATOR FOR ENGINES

BACKGROUND OF THE INVENTION

This invention relates to monitoring and annunciating systems and, more particularly, to such systems used to monitor the operation of an internal combustion engine, such as a diesel engine or the like, and to annunciate which of a plurality of monitored operating parameters or conditions has caused engine shut down.

Although the invention will be described in detail below with reference to a monitoring and annunciating system used in conjunction with a conventional diesel engine, such as a diesel engine that is used to power refrigeration equipment in a railroad refrigerator car, it is to be understood that the invention may be used in conjunction with other types of devices that have plural operating parameters of which it is desirable to effect monitoring and to indicate for a relatively long period of time the first operating parameter that fails and causes shut down of the device, especially when the device is remotely located and/or not subject to relatively frequent supervision. The instant invention, therefore, provides to an observer an indication of the first occurring fault that has caused the shut down of a monitored engine or similar device.

One prior art annunciator and control system is described in U.S. Pat. No. 3,512,405. The system of such patent includes respective logic indicating circuits directly coupled to parameter sensitive switches of a diesel engine to indicate occurrence of a shut down causing fault, and a disable circuit ensures that only the first occurring fault is indicated. A centrifugal switch in the engine closes when the engine comes up to speed, after which a timer delays the indication of a fault, for example, caused by the opening of a switch in response to low oil pressure, until the engine has been running sufficiently long for the oil to come up to proper operating pressure.

SUMMARY OF THE INVENTION

In the instant invention a plurality of indicating circuits are coupled for monitoring respective engine operating parameters, such as, for example, oil pressure, engine temperature, fuel level, and engine speed. Optical isolators are used for coupling respective indicating circuits to conventional parameter responsive switches of the diesel engine, such as an oil pressure switch, engine temperature switch, and the like, and a further optical isolator is coupled for energization by the engine generator, which generates an AC signal having a frequency substantially directly proportional to the engine speed, to provide an analog input to a speed detector that develops a digital output signal indicative of whether the engine speed is above or below a predetermined level. Moreover, using the digital engine speed signal an automatic reset circuit arrangement resets the respective indicating circuits upon occurrence of proper engine start up an during proper engine operation.

With the foregoing in mind, a primary object of the invention is to monitor a plurality of system parameters and to indicate the first parameter that changes from one predetermined condition to another.

Another object of the invention is to monitor a plurality of system parameters, to indicate a first fault or change in one of such parameters, and to prevent indication of subsequent faults or changes of other parameters.

An additional object of the invention is to monitor a diesel engine or the like to provide an indication of the first fault in one of the engine operating parameters that effects shut down of the same.

A further object of the invention is to provide electrical isolation between elements responsive to conditions or parameters of a system and a monitoring arrangement that indicates occurrence of a change of state of any one of such elements in response to occurrence of a condition that causes shut down of such system.

Still another object of the invention is to determine whether a cyclically occurring signal occurs above or below a predetermined frequency.

Still an additional object of the invention is to reset automatically a monitor arrangement, which indicates a first occurring fault or the like in a system, upon start-up of such system.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 3A through 3F are graphs of wave forms occurring at various portions of the circuit of FIG. 2 when no fault has been detected; and FIGS. 4A through 4F are graphs of wave forms occurring at various portions of the circuit of FIG. 2 when a fault is detected.

DESCRIPTION OF THE PREFERRED EMBODIMENT

Figure 1:
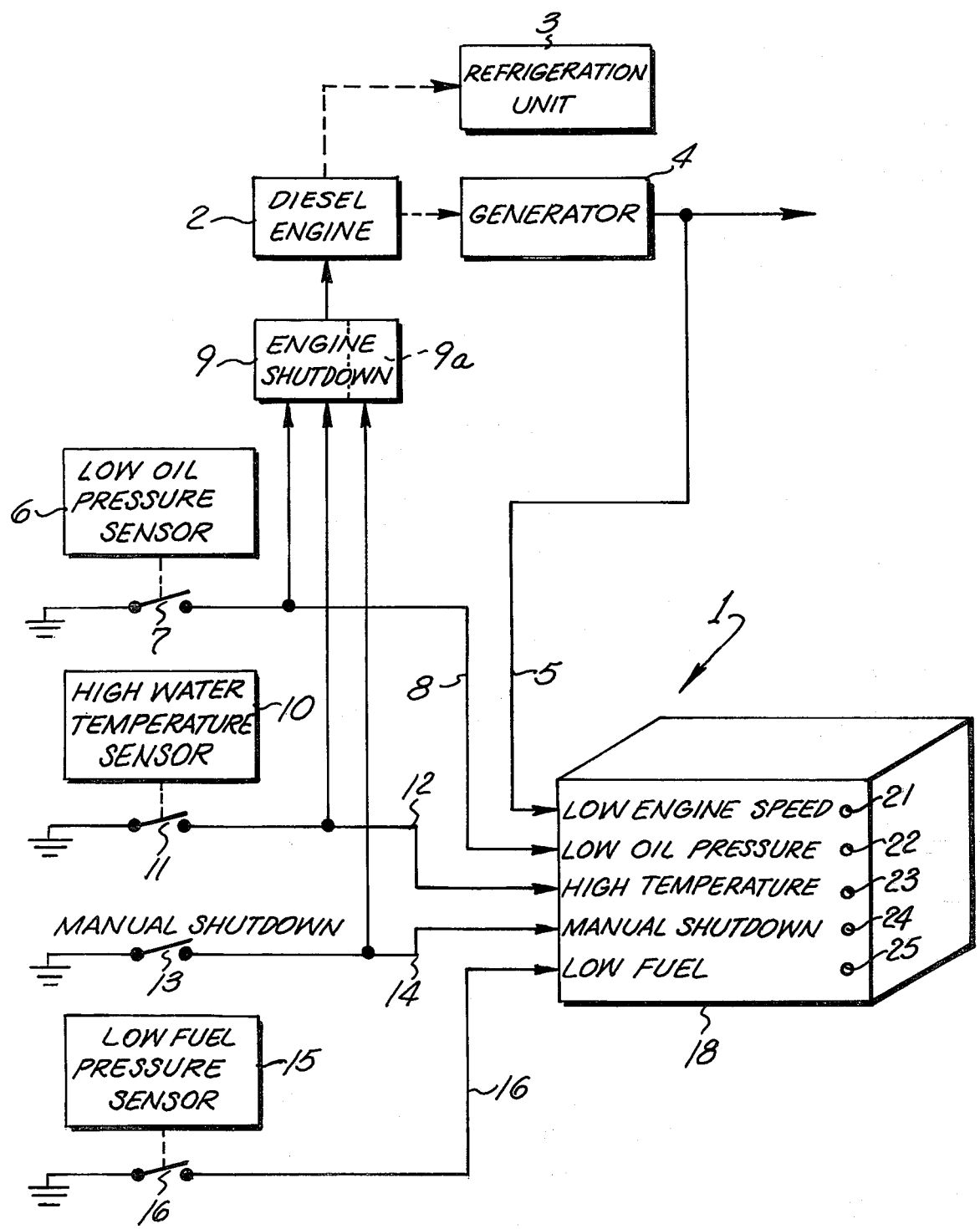
FIG. 1 is a block diagram of the monitor and annunciator system of the invention used to monitor a diesel engine.

Referring now more particularly to the drawings, wherein like reference numerals designate like parts in the several figures, in FIG. 1 a monitor and annunciating system is generally indicated at 1 in connection with a plurality of inputs, each being coupled to provide a signal indicative of an operating parameter of a diesel engine 2, which may be used, for example, to power a conventional refrigeration unit 3, such as a compressor and blower. More particularly, the diesel engine 2 provides a rotational output preferably at a speed and power level capable of efficiently operating the refrigeration unit, either directly or indirectly via an electric generator 4, which is coupled to the diesel engine drive shaft, for example, and provides an AC output signal that has a voltage and frequency substantially directly proportional to the diesel engine speed. The AC signal may be used to supply electric power to charge the engine battery, to run electrical equipment, etc., and a conductor 5 from the electric generator provides a first input to the monitor and annunciator system 1.

Associated with the diesel engine 2 are a low oil pressure sensor 6 that controls a switch 7, and when the latter is closed due to a sensed low oil pressure condition, a grounding circuit is provided along the conductor 8 to energize an engine shut down device 9, which may be a conventional butterfly valve on the air supply to the diesel engine. The conductor 8 is also connected as a second input to the monitor and annunciator system 1. Similarly, a high water or coolant temperature sensor 10, which indirectly responds to the engine temperature by sensing the temperature of the coolant thereof, is coupled to operate a switch 11 that provides a grounding circuit on the conductor 12 to effect identical operation of the engine shut down mechanism 9 and to provide a third input to the monitor and annunciator system.

Moreover, a manual shut down switch 13 may be selectively operated by a user to provide a grounding circuit on the conductor 14 to energize a separate part of the engine shut down apparatus, designated 9a, which may be a fuel cut-off solenoid or the like, to manually shut down the engine and to provide a fourth input to the monitor and annunciating system 1. A low fuel level or fuel pressure sensor 15 monitors the level of the fuel supply to the diesel engine and in response to a low condition will close a switch 16 that provides a grounding circuit on the conductor 17 as a fifth input to the monitor and annunciating system 1 for indicating such a low fuel condition prior to an indication, for example, of a reduced engine speed that would, of course, occur when the fuel supply is depleted.

In the preferred form of the invention the monitor and annunciating system 1 will be housed in a single package or housing 18 that includes appropriate labels, for example, as illustrated, attention to which is called by illumination or respective light emitting devices, such as light emitting diodes 21 through 25. The system also preferably uses complimentary metal oxides substrate semi-conductors in the plurality of logic circuits included in the circuit of FIG. 2, which will be described in more detail below, for such devices have desirable features including high input impedance, low power requirements, durability and the like, that improve the characteristics of the system when used in a relatively turbulent environment caused, for example, by the vibrations of the monitored equipment.

Figure 2:
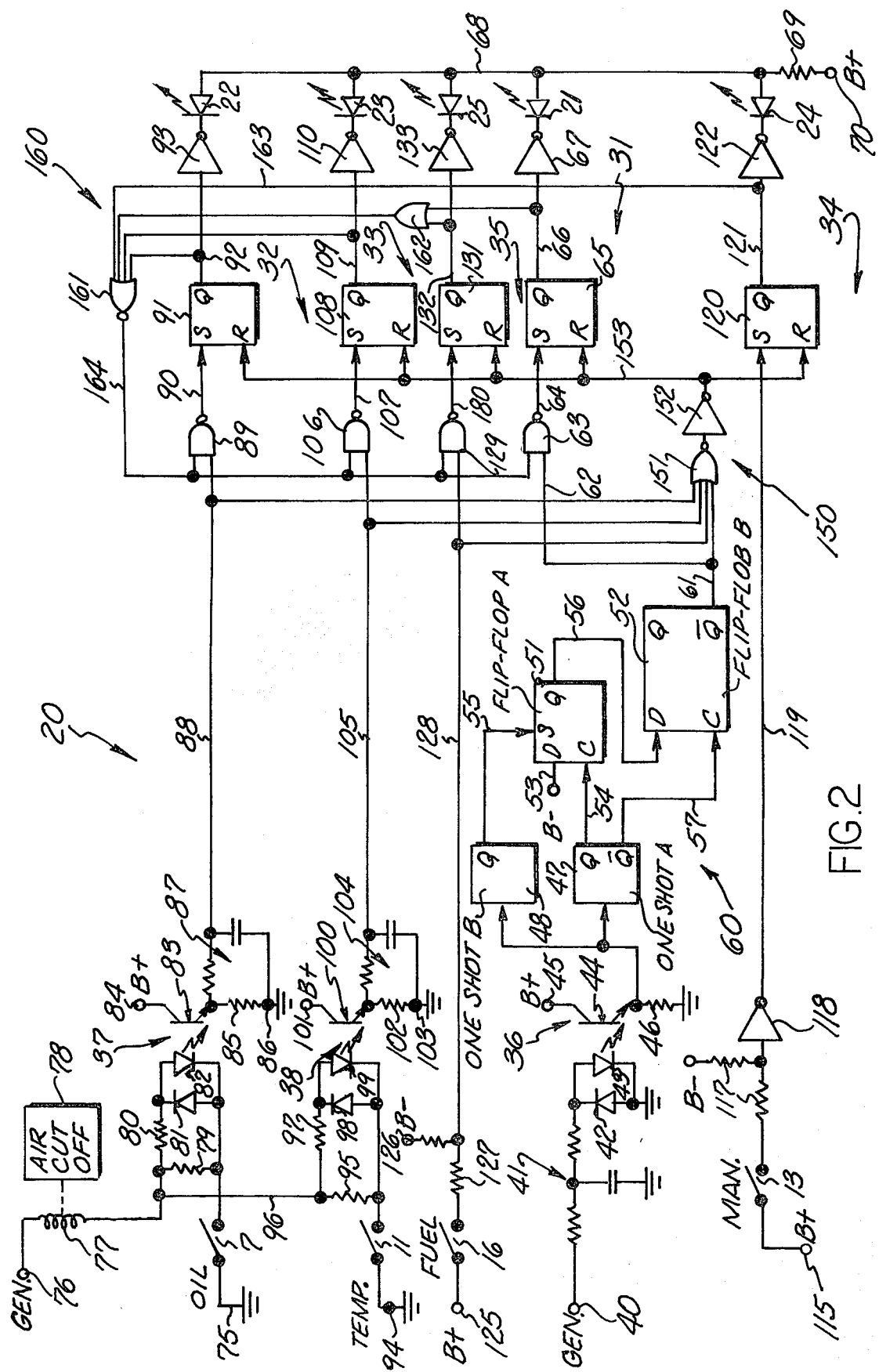
FIG. 2 is a schematic electric circuit diagram of the monitor and annunciator system of the invention coupled to parameter responsive equipment of a diesel engine.

Turning now more particularly to FIG. 2, a schematic electric circuit diagram of the monitoring and annunciating system 1 of FIG. 1 is generally indicated at 20. The circuit 20 automatically provides for selective energization of the respective light emitting diodes 21 through 25 to indicate the first occurring fault in the diesel engine. Power connections for various portions of the circuit 20 are indicated at terminals labeled B+ and B−, which represent connections to the positive and negative sides of the engine battery, and, moreover, certain terminals of the circuit that are coupled to the generator 4 are labeled accordingly. The terminals indicated grounded and the terminals indicated with a B− usually are interchangeable, especially in application of the invention in a vehicle or the like where the vehicle chassis represents both B− and relative ground potential. The circuit 20 includes several, preferably electronic, logic devices and amplifiers, and any required power for such devices would be taken, for example, from the engine battery by conventional connections, not shown.

The circuit 20 includes five respective indicating circuits 31 through 35 that are responsive to signals indicative of respective engine operating parameters and, particularly, to the failure thereof, which would lead to a subsequent engine shut down. The monitored parameters that would cause shut down are, for example, low engine speed, low oil pressure, high engine temperature, a manual shut down condition, and low fuel condition, although, if desired, other parameters may be monitored. The engine speed, oil pressure, and engine temperature indicating circuits are indirectly coupled to electrical systems associated with the diesel engine through respective conventional optical isolaters 36, 37, 38, in order to avoid any danger of feedback via ground loops and to prevent the circuit 20 from inadvertently causing engine shut down. Since the manual shut down indicating circuit 34 and low fuel condition indicating circuit 35 are not used with existing electrical circuits normally included in the operation of the engine, such circuits are able to be directly coupled to monitor the respective parameters.

Referring now particularly to the engine speed detecting and indicating circuit 31, a terminal 40 connected to the engine generator 4 of FIG. 1 provides an AC signal through a resistor and capacitor filter 41 that eliminates extraneous noise to a pair of anti-parallel connected diodes 42, 43, the latter being of the light emitting type and forming the active element of the optical isolater 36. The frequency of the AC signal supplied to the terminal 40 from the generator is substantially directly proportional to the engine speed and preferably is on the order of from 40 to 60 Hz when the engine is running at approximately 800 to 1200 rpm, respectively. The light emitting diode 43, of course, will emit light each time its anode is driven positive with respect to its cathode, i.e., when the generator AC signal goes positive.

The passive or driven element of the optical isolator 36 is a light sensitive transistor 44 that provides a low impedance path between the terminal 45 at which B+ voltage from the engine battery is supplied through a current limiting resistor 46 to a source of relative ground potential, which may be, for example, the vehicle chassis or the negative side of the engine battery, each time light from the light emitting diode 43 impinges on the photosensitive transistor. The approximate signal wave form normally occurring at the photosensitive transistor 44 emitter is depicted in FIGS. 3A and 4A.

The emitter of the photosensitive transistor 44 is coupled to the inputs of first and second one shot or monostable multivibrators 47, 48, the former, which may be referred to as one shot A or OSA below, being triggered upon occurrence of a positive going input signal and the latter, which may be referred to as one shot B or OSB below, being triggered upon occurrence of a negative going input signal. Moreover, each time OSA is triggered, the Q output goes high or to a logic 1 signal for a duration, say 20 milliseconds, after which it reverts back to a low or logic 0 level with the $\overline{Q}$ output being the inverse thereof, and each time OSB is triggered, it produces a brief high level or logic 1 signal on its Q output for approximately 0.001 milliseconds after which the output goes back to a low or logic 0 level. The principal constraint of the two one shot multivibrators 47, 48 is that upon triggering the former should produce a logic 1 signal on its Q output for a duration that is approximately equal to one-half the period of a complete cycle of the generator AC signal having a minimum acceptable frequency and the latter should produce a very short logic 1 pulse. The approximate signal wave forms normally occurring at the Q and $\bar{Q}$ outputs of OSA and at the Q output of OSB are depicted in FIGS. 3B, 3C, and 3F, respectively, when no fault has been detected, and in FIGS. 4B, 4C, and 4F, respectively, when a fault is detected.

A pair of data type flip-flops or bistable multi-vibrators 51, 52, which may be referred to below as flip-flops A or B or as FFA and FFB, are coupled to be driven by signals developed by the respective one shot multivibrators 47, 48. Each of the data flip-flops 51, 52 will pass the data signal applied at its data input to its Q output upon occurrence of a first positive going clock pulse supplied to its clock input, and the data signal will continue to be passed to the Q output until occurrence of the next positive going clock pulse or, in the case of the first flip-flop 51 upon occurrence of a logic 1 signal to the set input thereof. The approximate signal wave forms normally occurring at the Q output of FFA and at the $\bar{Q}$ output of FFB are respectively depicted in FIGS. 3E and 3D, when no fault has been detected, and in FIGS. 4E and 4D, when a fault is detected.

The flip-flop FFA has its data input D coupled to receive a negative, low level or logic 0 input signal supplied at the terminal 53, for example, from the negative terminal on the engine battery. A conductor 54 from the Q output of OSA is coupled to the clock input C of the FFA. Also, a conductor 55 couples the Q output from OSB to the set input S of the FFA. A conductor 56 couples the Q output of FFA to the data input D of FFB, and a conductor 57 couples the $\bar{Q}$ output of the OSA to the clock input C of FFB.

The first and second one shot multivibrators 47, 48 and the first and second flip-flops 51, 52 form a speed detecting circuit, which will be generally designated 60. It is to be understood, however, that the speed detecting circuit 60 is, in fact, a frequency detector that will provide on the output conductor 61 from the $\bar{Q}$ output of the second flip-flop 52 a logic signal indicative of whether the frequency of the monitored signal is above or below a predetermined level, which level is determined by the duration of the logic 1 signal at the Q output of the first one shot multivibrator 47 upon triggering thereof.

The output conductor 61 from the speed detecting circuit 60 is coupled by a conductor 62 to one input of a NAND gate 63, and the output from NAND gate is coupled by a conductor 64 to the set input S of a conventional set-reset flip-flop or latch 65. The flip-flop 65 uses negative gating, and, therefore, each time the set input receives a logic 0 signal, the Q output thereof provides a logic 1 signal on the conductor 66. The mentioned logic 1 signal will persist until a logic 0 signal is provided to the reset input R of the flip-flop 65, which cause the Q output thereof to provide a logic 0 signal on the conductor 66. The conductor 66 is connected to the input of a conventional inverting amplifier 67, which has its output connected to the cathode of the light emitting diode 21. The anode of the light emitting diode is connected to receive normally a positive signal occurring on a bus 68 from the terminal 69 through the resistor 70.

Turning now to the oil pressure responsive indicating circuit 32, such circuit is responsive to the open or closed condition of the oil pressure sensing switch 7, which is normally open when the engine oil pressure is at a satisfactory level and is normally closed when the oil pressure is below such level. The switch 7 is connected to provide a circuit between a grounded terminal 75 and a terminal 76 to which the generator 4 of FIG. 1 is connected, such circuit including an air cut-off solenoid 77, that when energized closes an air cut-off butterfly valve or the like 78 for shutting down the engine in the event of sensed low oil pressure, and a resistor 79. The switch 7 is a safety feature for the engine to effect shut down thereof in the event of low oil pressure to avoid damage to the engine, and, although not shown, a time delay circuit or the like may be used to maintain an effective open circuit between the terminals 75, 76 during engine start up when the oil pressure naturally would be lower than during normal operation.

Connected across the resistor 79 is a further resistor 80 in series with a pair of anti-parallel coupled diodes 81, 82, the latter being of the light emitting type and comprising the light emitter of the optical isolator 37. A photosensitive transistor 83 of the optical isolator 37 is aligned to receive light emitted by the light emitting diode 82, and such transistor is connected at its collector to a terminal 84 to receive a positive potential. The emitter of the photosensitive transistor 83 is connected via a resistor 85 to a source of ground potential at terminal 86. Therefore, whenever light from the light emitting diode 82 impinges on the photosensitive transistor 83, the latter provides a low impedance path for current flow from the terminal 84 via the resistor 85 to the terminal 86.

A resistor and capacitor filter 87 is connected to the emitter of the photosensitive transistor 83, and a conductor 88 from such filter is connected to one input of a NAND gate 89, the output from which is coupled via conductor 90 to the set input S of a conventional set-reset flip-flop 91 which operates on negative gating in the manner described above with reference to the flip-flop 65. The Q output of the flip-flop 91 is coupled via conductor 92 to the input of an inverting amplifier 93, the output of which is connected to the cathode of light emitting diode 22, which has its anode connected to the positive bus 68.

The temperature responsive indicating circuit 33 includes the conventional temperature responsive switch 11, which is coupled to complete a circuit for energization of the air cut-off solenoid 77 to a source of ground potential 94 via a resistor 95 and a conductor 96 when the engine coolant temperature exceeds a predetermined level. Thus, the switch 11 is normally open unless the engine begins to overheat, at which time the switch closes to effect engine shut down for the purpose of saving the engine from any subsequent damage.

The temperature responsive indicating circuit 33 is virtually identical to the oil pressure responsive indicating circuit 32 and includes a resistor 97 and diodes 98, 99 coupled across the resistor 95. The diode 99 is the light emitting diode of the optical isolator 38, and a photosensitive transistor 100 in the optical isolator responds to light emitted by the diode to provide a low impedance path from the terminal 101 at which a source of positive potential is connected via a resistor 102 to a source of ground potential 103. A resistor and capacitor filter circuit 104 is coupled across the resistor 102 and provides a signal on the conductor 105 when the transistor 100 is conducting as one of the inputs to a NAND gate 106. The output from the NAND gate is coupled by the line 107 to the set input S of the conventional set-reset flip-flop 108, which operates on negative gating, as described above, and the Q output of the flip-flop is coupled by a line 109 to the input of an inverting amplifier 110, the output from which is coupled to the cathode of the light emitting diode 23, which is coupled at its anode to the positive bus 68.

Each of the indicating circuits 31, 32, 33 is coupled to receive signal inputs from normally conventional existing systems of a diesel engine that monitor the operating parameters thereof, and in order to avoid feedback into such systems the optical isolators 36, 37, 38 are used. On the other hand, the manual shut down responsive switch 13 and the fuel pressure or fuel level responsive switch 16 are not coupled to any relatively dynamic portion of the diesel engine. The indicating circuits 34, 35 may be directly coupled to the switches 13, 16 without the need for electrical isolation.

The manual shut down responsive indicating circuit 34 includes the switch 13, which is normally open and is mechanically coupled to an engine stop switch for closure when the engine operator desires to stop the engine manually. When the switch 13 is closed, it provides a circuit from a source of positive potential at the terminal 115 to a source of negative potential at the terminal 116 via a pair of resistors 117. The junction of the pair of resistors is coupled to the input of an inverting amplifier 118, the output from which is coupled by a line 119 to the set input S of a conventional set-reset flip-flop 120 that operates on negative logic. The Q output from the flip-flop 120 is coupled by a line 121 to the input of an inverting amplifier 122, the output from which is coupled to the cathode of the light emitting diode 24, and the anode of the light emitting diode is coupled to the positive bus 68.

The fuel pressure responsive indicating circuit 35 includes the switch 16, which is normally open when the fuel pressure or level in the fuel tank supply to the engine is at a satisfactory level. When the fuel level drops below a predetermined level, the switch 16 closes to effect indication thereof by the indicating circuit 35. The purpose of the indicating circuit 35 is to indicate clearly to a user or inspector that the diesel engine has shut down on account of lack of fuel before the engine actually slows down, thus avoiding an indication of shut down on account of low engine speed that might indicate a defect in the engine.

The switch 16 is coupled to provide, when closed, a circuit between a source of positive potential at the terminal 125, and a source of negative potential at the terminal 126 via a pair of resistors 127. The junction of the resistors 127 is connected by a line 128 to one input of a NAND gate 129, the output from which is coupled by a line 130 to the set input S of a further set-reset flip-flop 131, which operates with negative gating as described above. The Q output from the flip-flop 131 is connected by a line 132 to the input of an inverting amplifier 133, the output from which is coupled to the cathode of the light emitting diode 25, which has its anode connected to the positive bus 68.

An automatic reset circuit generally indicated at 150 includes a NOR gate 151 that has four inputs coupled, respectively, to the conductors 61, 88, 105, 128 in the indicating circuits 31, 32, 33, 35, and the output from the NOR gate is coupled to an inverting amplifier 152. The output from the inverting amplifier 152 is connected to a line 153, which is in turn connected to the reset inputs R of each of the set-reset flip-flops 65, 91, 108, 120, 131. The purpose of the automatic reset circuit 150 is to reset each of the set-reset flip-flops when the engine is running properly after a restart.

Moreover, a disabling circuit is generally indicated at 160. The disabling circuit 160 includes a NOR gate 161, which has one or more inputs responsive to the signals at the Q output of each of the set-reset flip-flops. Three of the inputs to the NOR gate 161 are respectively directly coupled to lines 92, 109 and 121. The fourth input to the NOR gate 161 is taken from the OR gate 162 via the line 163 in order to increase the effective capability of the NOR gate 161, whereby the output of the OR gate 162 reflects the signals occurring on the lines 66 and 132. The OR gate may be eliminated if five input capacity were provided NOR gate 161. The output from the NOR gate 161 is coupled by the line 164 to a respective input of each of the NAND gates 63, 89, 106, 129 in the indicator circuits 31, 32, 33, 35 to disable the same when any one of the five indicating circuits has detected a fault and has announced the same by lighting a respective light emitting diode 21 through 25.

Operation of the monitor and annunciator system 1 of the invention will now be described. Assuming that the diesel engine 2 indicated in FIG. 1 is running properly at a suitable speed, with an adequate fuel supply, and having a suitable oil pressure and coolant temperature, all of the light emitting diodes 21 through 25 will be extinguished. However, upon occurrence of a drop in engine speed below a predetermined level, a drop in oil pressure below a predetermined level, an increase in coolant temperature above a predetermined level indicative of engine overheating, a manual shut down, or a low fuel condition, a respective light emitting diode 21 through 25 will be energized to emit light in order to indicate for a relatively long duration the first occurring or occurred fault that caused engine shut down. The duration of such indication will depend solely on the capacity of the battery that supplies power to the system 1.

When the diesel engine 2 is started, the generator 4 provides an output electric signal on the line 5, and the frequency and voltage of that signal is substantially directly proportional to the instantaneous engine speed. The AC signal from the line 5 is applied at the terminal 40, shown in FIG. 2, to cause the light emitting diode 43 to emit light each time the terminal 40 is relatively positive, and, therefore, the frequency of the pulsating light from the light emitting diode 43 will be equal to the frequency of the generator signal and substantially proportional to the diesel engine speed. Each time the photosensitive transistor 44 receives light from the light emitting diode 43, the emitter becomes relatively positive, and each time the light is cut off the emitter goes relatively negative.

The one shot multivibrator 47 (OSA) will be triggered on the leading edge of each positive going portion of the signal developed at the emitter of the photosensitive transistor 44, and upon such triggering, the Q and $\overline{Q}$ outputs of OSA, respectively, go to logic 1 and logic 0 signals for a predetermined duration, say in the preferred embodiment 20 milliseconds. The mentioned duration is preferably equal to one-half the period for each cycle of the AC signal from the generator 4 that is produced at a frequency substantially directly proportional to the minimum diesel engine speed that can be tolerated for continued diesel engine operation or operation of the equipment run by the diesel engine. Each time the emitter of the photosensitive transistor 44 goes negative, the leading edge of such negative going portion effects triggering of the one shot multivibrator 48 (OSB) which causes the Q outputs thereof to provide on the line 55 a positive going pulse for a very short duration of, say, 0.001 milliseconds.

Whenever the data flip-flop 51 (FFA) receives a logic 1 signal at its clock input C the logic 0 signal supplied at the data input D will be passed to the Q output for via the line 56 to the data input of the flip-flop 52 (FFB). Such logic 0 signal will continue to be produced at the Q output of FFA until a subsequent logic 1 signal is supplied to the clock input C of FFA or until a logic 1 signal is supplied to the set input S of FFA from OSB, at which time the Q output of FFA would go to logic 1 level. Moreover, whenever a logic 1 signal is supplied to the clock input C of FFB, the inverse of the signal then applied to the data input D thereof will be provided at the $\overline{Q}$ output on line 61.

Although other minimum speeds and frequencies may be selected, in the instant invention the minimum tolerable diesel engine speed will be on the order of approximately 500 rpm, at which speed the generator 4 provides an AC output signal on the line 5 at a frequency of 25 Hz, such signal having a one-half period of 20 milliseconds. Therefore, upon triggering of OSB the duration of the logic 1 signal at the Q output thereof will be set at 20 milliseconds. Other predetermined frequencies may simply be set in the speed detecting circuit 60 by adjustment of OSA to vary the mentioned duration such that it equals one-half the period of the minimum frequency signal.

Assuming that the diesel engine 2 is running at normal operating speed of say 1200 rpm, the generator 4 will produce an AC signal having a frequency of 60 Hz, the half period of which is on the order of 8 milliseconds, and, therefore, the signal appearing at the emitter of the photosensitive transistor 44 will appear as is illustrated in FIG. 3A having alternate high and low levels indicative of logic 1 and logic 0 signals, respectively. The leading edge of each logic 1 signal from the emitter of the photosensitive transistor 44 will trigger the one shot multivibrator 47 (OSA) closing the Q and $\overline{Q}$ outputs thereof to produce, respectively, logic 1 and logic 0 signals for a 20 millisecond duration, depicted in FIGS. 3B and 3C, and the trailing edge of such logic 1 signal from the photosensitive transistor 44 will cause the one shot multivibrator 48 (OSB) to provide a brief logic 1 pulse for approximately 0.001 millisecond at its Q output, as is illustrated in FIG. 3F.

A logic 1 signal on the Q output of OSA will cause the flip-flop 51 (FFA) to pass the logic 0 signal from its data input D to its Q output, as is depicted in FIG. 3E, to provide the same on the conductor 56 to the data input D of the flip-flop 52 (FFB). The inverse of that logic 0 signal to the data input of FFB is not, however, passed to the $\overline{Q}$ output thereof unless the Q output of OSA is at logic 1. Therefore, as long as the half period of the AC signal appearing at the emitter of the photosensitive transistor 44, as illustrated, for example in FIG. 3A, is of a duration at least slightly less than the duration of the logic 1 at the Q output of OSA, upon triggering of the latter, the $\overline{Q}$ output of FFB will remain at logic 0 as is illustrated in FIG. 3D. Thus, logic 0 on the line 61 implies that the motor speed is above a predetermined minimum level. In short, if the OSB pulse occurs during the on duration after triggering of OSA, the $\overline{Q}$ output of FFB will remain at logic 0 implying a satisfactory speed condition.

The signal wave forms occurring in the speed detecting circuit 60 when the engine speed drops below its predetermined minimum level of 500 rpm are illustrated in FIGS. 4A through 4F. If the engine speed drops below 500 rpm and the generator signal drops below 25 HZ, it is noted that the signal at the emitter of the photosensitive transistor 44 will be at logic 1 level for more than 20 milliseconds and, therefore, will not terminate until after the expiration of the logic 1 signal at the Q output of OSA, as is illustrated, respectively, in FIGS. 4A and 4B. Thus, at the instant that the $\overline{Q}$ output of OSA goes to logic 1, the logic 0 at the data input D of FFB will cause the $\overline{Q}$ output of FFB to go to logic 1 that implies the frequency of the monitored signal and, accordingly, the engine speed are too low.

It should be appreciated that the speed detecting circuit 60 may be used to monitor any AC signal to indicate an occasion when that signal frequency drops below a predetermined level. Moreover, such circuit may be used to detect and to indicate when the frequency of a monitored signal is above a predetermined level.

If the oil pressure sensing switch 7 is open, there will be no signal to energize the light emitting diode 82, and a logic 0 signal will appear on the line 88, which implies a proper oil pressure. However, if the oil pressure sensing switch 7 closes, due to low oil pressure the light emitting diode 82 will periodically cause the photosensitive transistor 83 to conduct at which time a logic 1 signal is applied to the conductor 88 indicating low oil pressure. The temperature responsive switch 11 operates similarly as the oil pressure sensing switch 7. Thus, if the engine temperature is below a predetermined level, the photosensitive transistor 100 will not be energized, and a logic zero will appear on the line 105; however, upon sensing a high engine coolant temperature, the switch 11 will close and the light emitting diode 99 will periodically cause the transistor 100 to conduct to place periodically a logic 1 signal on the line 105 indicative of a high engine temperature.

As long as the fuel pressure is adequate, the fuel pressure responsive switch 16 remains open, and a logic 0 is applied to the line 128; however, if the fuel level drops below a predetermined level, the switch 16 will close to apply a logic 1 signal on the line 128. Therefore, it should be understood that as long as a logic 0 appears on the lines 61, 88, 105, 128, the engine will be assumed to be operating properly; however, if a logic 1 signal appears on any one of those lines, such a signal implies that a fault has occurred in the respective monitored system or parameter.

The manual shut down responsive switch 13 is normally open when the engine is operating and is closed only when a manual shut down or engine stopping has occurred. Whenever the switch 13 is open, a logic 0 signal is applied to the input of the inverting amplifier 118, which supplies a logic 1 signal on the line 119 as an input signal to the set input S of the set-reset flip-flop 120. If the switch 13 is closed, the input to the inverting amplifier 118 becomes a logic 1, which causes the output on the line 119 to become a logic 0 that implies a manual shut down has occurred.

When the engine is started up, it is assumed that the temperature responsive switch 11, manual shut down responsive switch 13, and fuel pressure responsive switch 16 are all open so that logic 0's appear on the lines 105, 128 and a logic 1 appears on the line 119. Since the oil pressure may be low at the beginning of engine start up, a logic 1 may appear on the line 88; however, for purposes of understanding the invention, it may be assumed that the oil pressure instantaneously goes to a suitable pressure so that a logic 0 appears at the line 88 after start up. The engine speed, however, during start up is below its predetermined level of say 500 rpm and, therefore, a logic 1 signal is produced on the line 61 at the $\bar{Q}$ output of FFB, in the manner described above.

The automatic reset circuit 150 now comes into use, and its operation will be described assuming that logic 0 signals appear on the lines 88, 105, 128 and a logic 1 signal appears on the line 61; however, if a logic 1 were to appear on any of the former lines, similar operation of the automatic reset circuit 150 also would occur until the engine were operating properly.

The logic 1 on the line 61 during engine start up effects a logic 0 output from the NOR gate 151 and a logic 1 output on the line 153 from the inverting amplifier 152. Since all of the set-reset flip-flops 65, 91, 108, 120, 131 use negative gating, nothing will happen to them at this time. However, when the engine comes up to speed, above 500 rpm, and all the monitored parameters are such that the switches 7, 11, 13 and 16 are open, the change to all logic 0 input signals to the NOR gate 151 will cause the same to emit a logic 1 output, and a logic 0 signal will be applied by the inverting amplifier 152 on the line 153. The leading edge of the logic 0 signal supplied to the line 153 causes each of the set-reset flip-flops to go to their reset condition whereby the Q outputs of each become logic 0. Therefore, the outputs of each of the inverting amplifiers 67, 93, 110, 122, 133 become logic 1, and each of the light emitting diodes 21 through 25 will be de-energized. Moreover, all of the inputs to the NOR gate 161 in the disabling circuit 160 will be at logic 0, and the output therefrom will be at logic 1, which signal is supplied as an enabling signal to each of the NAND gates 63, 89, 106, 129.

Now the monitor and annunciating system 1 is conditioned to sense and to annunciate a fault occurring in any one of the monitored parameters. Therefore, if a logic 1 signal were to appear on any one of the lines 61, 88, 105, 128 in a manner as described above upon occurrence of a detected fault, the corresponding NAND gate, such as the NAND gate 89 in the oil pressure responsive indicating circuit 32, would have applied to both inputs logic 1 signals causing the same to produce a logic 0 signal at its output, such as at the output of the NAND gate 89 on the line 90. The logic 0 signal on line 90 causes the flip-flop 91 to go to its set condition producing a logic 1 at its Q output on the line 92. That logic 1 signal on the line 92 causes a negative output from the inverting amplifier 93 that effects energization of the light emitting diode 22 to indicate that the oil pressure has dropped below a predetermined minimum level. Moreover, the logic 1 signal on the line 92 causes the NOR gate 161 to produce a logic 0 output on the line 164, which disables all of the NAND gates 63, 89, 106, 129 from providing logic 0 signals at their respective outputs upon occurrence of a subsequent fault. Similar operation of the other indicating circuits 31, 33 or 35 occurs upon detection of a different respective first occurring fault.

Moreover, upon occurrence of a manual shut down, closure of the manual shut down responsive switch 13 effects production of a logic 0 signal on the line 119, which causes the flip-flop 120 to produce a logic 1 signal at its Q output on the line 121. The logic 1 signal on the line 121 is inverted by the inverting amplifier 122 to effect energization of the light emitting diode 24. Also, the logic 1 signal on the line 121 similarly effects operation of the disabling circuit 160 in the manner described above.

From the foregoing, it should be clear that the instant system of the invention facilitates detection of the reason for engine shut down by a supervisory person who only occasionally checks a remotely operated diesel engine or the like. It is also to be understood that although several specific engine operating parameters are described for monitoring in the present system, additional parameters or conditions also may be monitored applying the above-described principles. Moreover, the system of the invention also may be used in various applications for monotoring parameters of a system other than a diesel engine and to provide for a long time an indication of the first occurring fault that has caused the system to shut down.

The embodiments of the invention in which an exclusive property or privilege is claimed are defined as follows:

1. A monitor for use with a system having a plurality of sensors for respectively providing fault signals in response to faults occurring at respective locations in said system and capable of causing system shut down, comprising:
   a plurality of isolation means each having an input circuit adapted to respond to a respective one of said fault signals for providing a non-electrical signal representative of said fault signal, and an output circuit electrically isolated from said input circuit and having means responsive to said non-electrical signal to provide a second electrical fault signal; and,
   indicating means connected to said output circuits of said plurality of isolation means and responsive to said second fault signals for indicating the first occurring fault in the monitored system.

2. A monitor as set forth in claim 1, each of said isolating means comprising an optical isolator.

3. A monitor as set forth in claim 2, each of said optical isolators comprising a light emitting element serving as said input circuit and a light sensitive element serving as said output circuit and positioned to receive light from said light emitting element, each of said light emitting elements being adapted to be coupled to respective ones of such sensors, and each of said light sensitive elements being coupled to said indicating means for controlling the same to indicate the system parameter having a first occurring fault.

4. A monitor as set forth in claim 3, in combination with a plurality of sensors comprising respective switches, and said light emitting elements being coupled to respective switches for emitting light when the respective switch is actuated.

5. A monitor as set forth in claim 4, wherein said switches comprise pressure responsive and temperature responsive switches of an engine, such switches being normally open when the respective monitored parameters are at satisfactory levels, a respective light emitting element being coupled to each of said switches to emit light upon closure thereof, and each of said light sensitive means being coupled to provide a signal to a respective indicating means representative of the condition of the monitored engine parameter.

6. A monitor as set forth in claim 4, wherein such system comprises an engine, and such sensors comprise an AC generator that generates an AC signal at a frequency substantially proportional to the engine speed, at least one of said light emitting elements being coupled to said generator to emit light during alternate half cycles of the AC signal, and means for indicating occurrence of engine speed below a predetermined speed.

7. A monitor as set forth in claim 6, said indicating means comprising first means coupled to said light sensitive means and responsive to the leading edge of one portion of the output signal from the latter for producing a fixed output signal of a predetermined duration, second means coupled to said light sensitive means and responsive to the trailing edge of such portion of the output signal from the latter for producing a pulse output signal of short duration relative to such predetermined duration, and means coupled to said first and second means and responsive to such fixed and pulse output signals for producing first and second indicating signals, respectively, depending on whether such pulse output signal occurs within or without the duration of such fixed output signal, such first and second output signals being respectively indicative of whether said engine speed is above or below such predetermined level.

8. A monitor as set forth in claim 1, further comprising disabling means coupled to said indicating means and responsive to one of said indicating means indicating a fault in a system parameter for disabling the other of said indicating means ffor indicating a subsequent fault in another system parameter, and automatic reset means for resetting all of said indicating means upon start-up of such system.

9. Apparatus for monitoring the operating parameters of a machine to indicate the first occurring fault in a monitored parameter of the latter capable of causing shut down thereof, comprising:
a plurality of indicating means comprising a respective latch circuit responsive to respective operating parameters of such machine for indicating failure of such parameters, and for maintaining continuous indication of a detected fault until the fault has been eliminated and said latch has been reset;
disabling means coupled to said indicating means and responsive to one of said indicating means indicating a failed parameter for disabling the other of said indicating means from indicating a subsequent failed parameter; and,
automatic reset means comprising a logic gate having a plurality of inputs, each being coupled to a respective indicating means, said logic gate being operable to effect resetting of said latch circuits upon occurrence of all the input signals thereto being at the same logic level.

10. Apparatus as set forth in claim 9, each of said latch circuits comprising a set-reset flip-flop, and said logic gate being coupled to provide a signal to reset all of said flip-flops upon occurrence of such same logic level.

11. Apparatus as set forth in claim 10, said logic gate comprising a NOR gate.

12. Apparatus as set forth in claim 11, further comprising means for inverting the output of said NOR gate, said means for inverting being connected between the output of said NOR gate and the reset inputs of said flip-flops, and each of said flip-flops being operable on receipt of negative gating signals.

13. Apparatus for monitoring the operating parameters of a machine to indicate the first occurring fault in a monitored parameter of the latter capable of causing shut down thereof, comprising: a plurality of indicating means responsive to respective operating parameters of such machine for indicating failure of such parameters, each of said indicating means comprising a respective latch circuit for maintaining continuous indication of a detected fault until the fault has been eliminated and said latch has been reset; disabling means coupled to said indicating means and responsive to one of said indicating means indicating a failed parameter for disabling the other of said indicating means from indicating a subsequent failed parameter, and automatic reset means for resetting all of said indicating means upon start-up of such machine and comprising means for resetting said latch circuits; a plurality of said indicating means each further comprising a first logic gate having an output coupled to one input of said latch circuit for operating the same, said first logic gate having a first input coupled to said disabling means and a second input coupled to receive a signal representative of the condition of a monitored parameter, whereby when the first occurring fault after said automatic reset means has reset said latch circuits will cause a respective one of said first logic gates to operate its respective latch circuit to effect production of a signal indicative of such fault.

14. Apparatus as set forth in claim 13, said automatic reset means comprising a further logic gate having a plurality of inputs, each being coupled to a respective second input of said first logic gates, the output of said further logic gate being coupled to a second input of each of said latch circuits for operating the same upon occurrence of all the inputs to said further logic gate being indicative of no detected fault, whereby upon such occurrence all of said latch circuits are operated to effect production of respective signals indicative of no detected fault.

15. Apparatus for monitoring the operating parameters of a machine to indicate the first occurring fault in a monitored parameter of the latter capable of causing shut down thereof, wherein such machine comprises an engine including an AC generator that generates an AC signal of a frequency substantially proportional to the engine speed, said apparatus comprising:
a plurality of indicating means responsive to respective operating parameters of such machine for indicating failure of such parameters and wherein one of said indicating means comprises means for monitoring the speed of said engine, comprising first means coupled to said AC generator for producing an AC output signal of frequency and period directly proportional to that of such generator AC signal, second means coupled to said first means and responsive to the leading edge of one portion of the AC output signal from the latter for producing a fixed output signal of a predetermined duration, third means coupled to said first means and responsive to the trailing edge of such portion of the AC output signal from the latter for producing a pulse output signal of short duration relative to such predetermined duration, and fourth means coupled to said second and third means and responsive to such fixed and pulse output signals for producing first and second indicating signals, respectively, depending on whether such pulse output signal occurs within or without the duration of such fixed output signal, such first and second indicating signals being respectively indicative of whether said engine speed is above or below a predetermined level, the latter being a fault condition, disabling means coupled to said indicating means and responsive to one of said indicating means indicating a failed parameter for disabling the other of said indicating means for indicating a subsequent failed parameter, and automatic reset means for resetting all of said indicating means upon start up of such machine.

16. Apparatus for producing a digital output signal indicative of whether an AC signal is occurring above or below a predetermined frequency comprising first means responsive to the beginning of one portion of such AC signal for producing a fixed output signal of a predetermined duration, second means responsive to the end of such portion of the AC signal for producing a pulse output signal of short duration relative to such predetermined duration, and third means coupled to said first and second means and responsive to such fixed and pulse output signals for producing first and second digital signals, respectively, depending on whether such pulse output signal occurs within or without the duration of such fixed output signal, such first and second digital signals being respectively indicative of whether the frequency of such AC signal is above or below such predetermined frequency.

17. Apparatus as set forth in claim 16, wherein such one portion is one half period of such AC signal, and said first means comprises a first one shot multivibrator that triggers on the leading edge of such AC signal at the beginning of such half period.

18. Apparatus as set forth in claim 17, said second means comprising a second one shot multivibrator that trigger on the trailing edge of such AC signal at the end of such half period.

19. Apparatus as set forth in claim 16, wherein such one portion is one half period of such AC signal, and said third means comprises bistable flip-flop means for producing such first output signal when the duration of such half period is less than such predetermined duration of such fixed output signal and for producing such second output signal when the duration of such half period is greater than such predetermined duration of such fixed output signal.

20. Apparatus as set forth in claim 19, said first and second means comprising respective first and second one shot multivibrators, the former triggering on the leading edge of such AC signal at the beginning of such half period and the latter triggering on the trailing edge of such AC signal at the end of such half period.

21. Apparatus as set forth in claim 20, said bistable flip-flop means comprising first and second data type flip-flops, said first data type flip-flop being coupled to said first and second one shot multivibrators for passing a data signal output in response to the occurrence of such fixed output signal and for stopping such passage upon the occurrence of such pulse signal output, said second data type flip-flop being coupled to said first one shot multivibrator and to said first data type flip-flop for passing a first output signal not representative of such data output signal when such pulse output signal occurs within the duration of such fixed output signal and a second output signal representative of such data output signal when such pulse output signal occurs after termination of the duration of such fixed output signal, such first and second output signals being such respective first and second digital signals.

22. Apparatus as set forth in claim 21, said apparatus being coupled to the AC generator of an engine, said AC generator generating an AC generator signal at a frequency substantially directly proportional to the engine speed, and further comprising isolating means coupled to said AC generator for producing such AC signal at a frequency equal to that of such AC generator signal.

23. Apparatus as set forth in claim 22, said isolating means comprising optical isolator means including light emitting means for emitting light during alternate half cycles of such AC generator signal, and light sensitive means for producing such AC signal, said light sensitive means being coupled to the trigger inputs of said first and second one shot multivibrators.

* * * * *